(12) United States Patent
Preston et al.

(10) Patent No.: US 10,343,242 B2
(45) Date of Patent: Jul. 9, 2019

(54) RECONFIGURABLE FASTENER MULTI-SPINDLE TOOL AND METHOD

(71) Applicant: GM Global Technology Operations LLC, Detroit, MI (US)

(72) Inventors: Christopher B. Preston, Troy, MI (US); Mark L. Graham, Highland, MI (US); Christine A. Cugini, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 444 days.

(21) Appl. No.: 15/277,316

(22) Filed: Sep. 27, 2016

(65) Prior Publication Data

US 2018/0085870 A1  Mar. 29, 2018

(51) Int. Cl.
*B23P 19/06* (2006.01)
*B23P 19/04* (2006.01)

(52) U.S. Cl.
CPC .......... *B23P 19/069* (2013.01); *B23P 19/042* (2013.01); *B23P 2700/50* (2013.01)

(58) Field of Classification Search
CPC ... B23P 19/069; B23P 19/042; B23P 2700/50; B25B 13/488; B25B 13/48; B25B 13/5058; B25B 13/463; B25B 21/002; B25B 23/141; B25B 23/1427; B25B 15/02; B25B 21/00; B25B 23/14
See application file for complete search history.

(56) References Cited

U.S. PATENT DOCUMENTS 6,134,989 A * 10/2000 Stevens ................. B23P 19/069
  81/57.22

* cited by examiner

*Primary Examiner* — Robert J Scruggs

(57) ABSTRACT

A reconfigurable fastener multi-spindle tool system includes multiple spindle assemblies, each including a support ring and a support arm sleeve received in the support ring and rotatable on a central longitudinal axis of the support ring. At least one support arm is connected to the support ring. The at least one support arm rotates with respect to the central longitudinal axis. A spindle is fixed to the support arm and is displaceable with respect to the central longitudinal axis. The spindle has an adaptor to temporarily retain and torque a fastener. A reaction plate is connected to the spindle and has a geometric shape. At least one template plate has multiple openings each having a geometric shape matching the geometric shape of the reaction plate. One of the openings receives the reaction plate thereby preventing axial rotation of the spindle.

17 Claims, 5 Drawing Sheets

*Prior Art*

*Prior Art*

RECONFIGURABLE FASTENER MULTI-SPINDLE TOOL AND METHOD

FIELD

The present disclosure relates to spindle tools used for fastener installation and torque application in automobile drive train components such as transmission cases.

BACKGROUND

The statements in this section merely provide background information related to the present disclosure and may or may not constitute prior art.

Automobile drive train components such as transmission and differential cases are commonly coupled using fasteners. It is desirable to install all of the fasteners at the same time and using a common torque such that the fasteners apply an even-loading across the surface area of a gasket positioned between case portions. When multiple transmissions or differentials of the same design are assembled in repetitive sequences, the bolt pattern of each assembly is the same. Multiple torque application tools can therefore be combined into a common assembly or fixture such that all of the fasteners for a given case design can be installed and torqued at the same time. Such fixtures have a predetermined spacing and orientation for the torque application tools. Typically, the torque application tools cannot be moved in the fixture in more than a single direction due to the constraints of the fixture. It is highly labor intensive and therefore expensive to repurpose a fixture for installing fasteners of a different case design having a different bolt pattern.

Thus, while current torque application tool fixtures achieve their intended purpose, there is a need for a new and improved system and method for installing and torquing fasteners that can be easily adapted for use in two or more case designs each having a different bolt pattern.

SUMMARY

According to several aspects, a reconfigurable fastener multi-spindle tool system includes multiple spindle assemblies, each including: a support arm sleeve rotatable on a central longitudinal axis; at least one support arm connected to the support ring, the at least one support arm rotating with respect to the central longitudinal axis; a spindle connected to the at least one support arm and rotatable with respect to the central longitudinal axis, the spindle having an adaptor operating to hold and torque a fastener. A reaction plate is connected to the spindle and having a geometric shape. At least one template plate has multiple openings each having a geometric shape matching the geometric shape of the reaction plate. One of the openings receives the reaction plate of one of the multiple spindle assemblies thereby preventing spindle axial rotation.

In an additional aspect of the present disclosure, the multiple spindle assemblies each include a support ring, the support arm sleeve receives the support ring and rotates with respect to the support ring.

In another aspect of the present disclosure, the at least one support arm includes a first support arm directly connected to the support ring and a second support arm rotatably connected to the first support arm, the spindle directly connected to the second support arm and displaced with respect to the central longitudinal axis by rotation of the second support arm independent of the first support arm.

In another aspect of the present disclosure, the first support arm and the second support arm extend generally perpendicular to the central longitudinal axis.

In another aspect of the present disclosure, a pin extends through an aperture of the first support arm to rotatably connect the second support arm to the first support arm.

In another aspect of the present disclosure, the pin defines an axis of rotation for the second support arm independent from the central longitudinal axis.

In another aspect of the present disclosure, a base member is connected to the support ring and is connected to and supports the spindle assembly on a support member; and a shaft is connected to the support ring and extends co-axially on the central longitudinal axis of the base member.

In another aspect of the present disclosure, the support arm sleeve is biased in a first direction "A", the support arm sleeve when moved in a direction "B" opposite to the direction "A" permits a key extending from the support arm sleeve to be received in a key-slot created in the support ring, thereby temporarily fixing the support arm sleeve to the support base member.

In another aspect of the present disclosure, the at least one template plate includes a substantially planar body.

In another aspect of the present disclosure, the spindle is movable to different aperture locations of multiple different gaskets and multiple different housing fastener positions.

In another aspect of the present disclosure, the at least one template plate includes multiple template plates each having an outer perimeter shaped to mimic one of the different aperture locations of the multiple different housing fastener positions.

In another aspect of the present disclosure, each of the multiple openings of the at least one template plate is centrally aligned with an aperture created in one of the housing fastener portions.

In another aspect of the present disclosure, the support arm sleeve is manually rotatable and manually axially displaceable with respect to the support ring.

In another aspect of the present disclosure, the support arm sleeve is normally biased away from a temporary locked position.

According to several aspects, a reconfigurable fastener multi-spindle tool system includes multiple spindle assemblies. Each includes: a support ring; a support arm sleeve movable in the support ring and rotatable on a central longitudinal axis of the support ring; at least one support arm connected to the support ring, and rotating with respect to the central longitudinal axis. A spindle is fixed to the at least one support arm and is displaceable with respect to the central longitudinal axis. The spindle has an adaptor operating to temporarily retain and torque a fastener. A reaction plate is connected to the spindle and has a geometric shape. At least one template plate has multiple openings each having a geometric shape matching the geometric shape of the reaction plate. One of the openings receives the reaction plate thereby preventing axial rotation of the spindle during tightening of the fastener.

In another aspect of the present disclosure, the reaction plates of the other spindle assemblies are individually positioned in the remaining openings such that all of the spindle assemblies are operable at the same time.

In another aspect of the present disclosure, the at least one support arm includes a first support arm and a second support arm rotatably connected to the first support arm.

In another aspect of the present disclosure, each spindle assembly further includes a base member connected to the support ring and connected to a support member, wherein the spindle assemblies, the at least one template plate and the support member define a fixture.

In another aspect of the present disclosure, a key extends from the support arm sleeve received in a key-slot created in the support ring, thereby temporarily fixing the support arm sleeve to the support base member.

According to several aspects, a method for operating a reconfigurable fastener multi-spindle tool system comprises constructing a spindle assembly, including: slidably disposing a support arm sleeve in a support ring such that the support arm sleeve is rotatable on a central longitudinal axis of the support ring; connecting first and second support arms to the support ring to be rotatable with respect to the central longitudinal axis; fixing a spindle to the second support arm such that the spindle is displaceable with respect to the central longitudinal axis and rotatable with respect to an axis of rotation of the second support arm; providing the spindle with an adaptor operating to temporarily retain and torque a fastener; and connecting a reaction plate having a geometric shape to a mounting plate; installing a template plate adjacent to the spindle assembly, the template plate having multiple openings each having a geometric shape matching the geometric shape of the reaction plate; positioning the spindle proximate to one of the multiple openings; and inserting the reaction plate into one of the openings to prevent axial rotation of the spindle when the fastener is installed by operation of the spindle.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
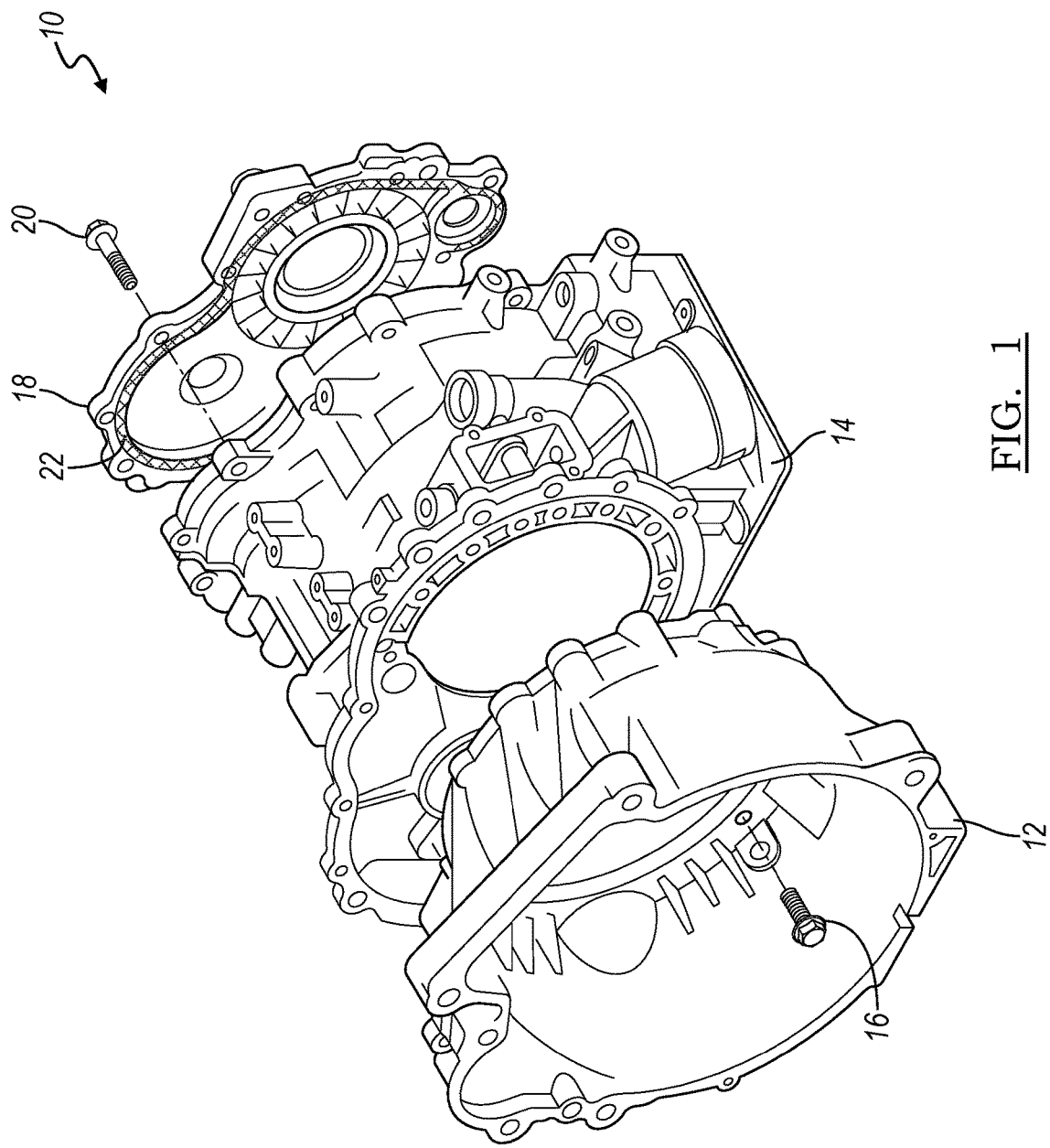
FIG. 1 is a front left perspective assembly view of an automatic transmission which can be fastened using a reconfigurable fastener multi-spindle tool of the present disclosure.

Referring to FIG. 1, an exemplary automotive transmission 10 includes a first housing portion 12 connected to a drive assembly portion 14 using multiple threaded fasteners 16. Similarly, a second housing portion 18 can be connected at an opposite end of the drive assembly portion 14 using multiple fasteners 20. The first and second housing portions 12, 18 and the drive assembly portion 14 are typically cast from a metal such as aluminum or steel. A gasket (not visible in this view) is positioned between the first housing portion 12 and the drive assembly portion 14, and a gasket 22 is positioned between the drive assembly portion and the second housing portion 18. To apply even loading pressure across the gasket, it is desirable to install each of the fasteners at the same time and with a common torque.

Referring to FIG. 2 and again to FIG. 1, a typical housing portion or case 24 includes multiple apertures 26a, 26b, 26c, 26d, 26e, 26f, 26g, 26h, 26j, 26k, 26l, 26m, 26n, 26p, 26q, 26r defining a bolt pattern 28. In many case designs, approximately 18 to 20 apertures can be provided about a perimeter 30 of the case. In addition, interior positioned apertures 32 can also be provided, defining a bolt pattern 34.

Figure 2:
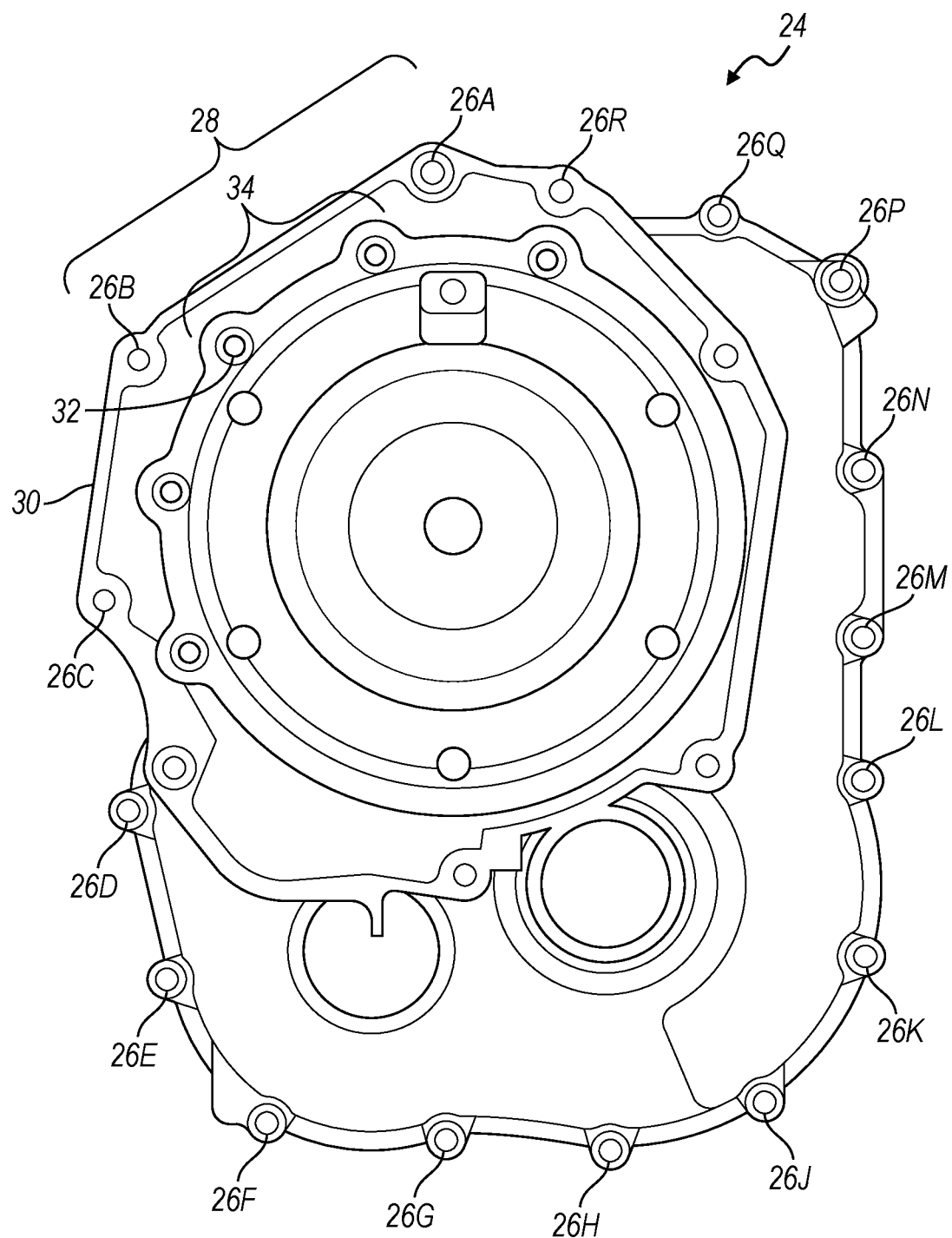
FIG. 2 is an end elevational view of a transmission case portion of FIG. 1.

Referring to FIG. 3 and again to FIGS. 1 through 2, a reconfigurable fastener multi-spindle tool system 36 of the present disclosure allows fastening a substantially unlimited quantity of different bolt patterns for multiple different case designs. As an example only, the tool system 36 is adapted for use with four different bolt patterns represented by different geometries of a first transmission bolt pattern 38, a second transmission bolt pattern 40, a third transmission bolt pattern 42, and a fourth transmission bolt pattern 44. The tool system 36 includes multiple spindle assemblies, including spindle assemblies 46a, 46b, 46c, 46d, 46e, 46f each mounted to a first support member 48, spindle assemblies 50a, 50b, 50c, 50d, 50e each mounted to a second support member 52, spindle assemblies 54a, 54b, 54c, 54d, 54e each mounted to a third support member 56, and spindle assemblies 58a, 58b, 58c, 58d each mounted to a fourth support member 60.

Figure 3:
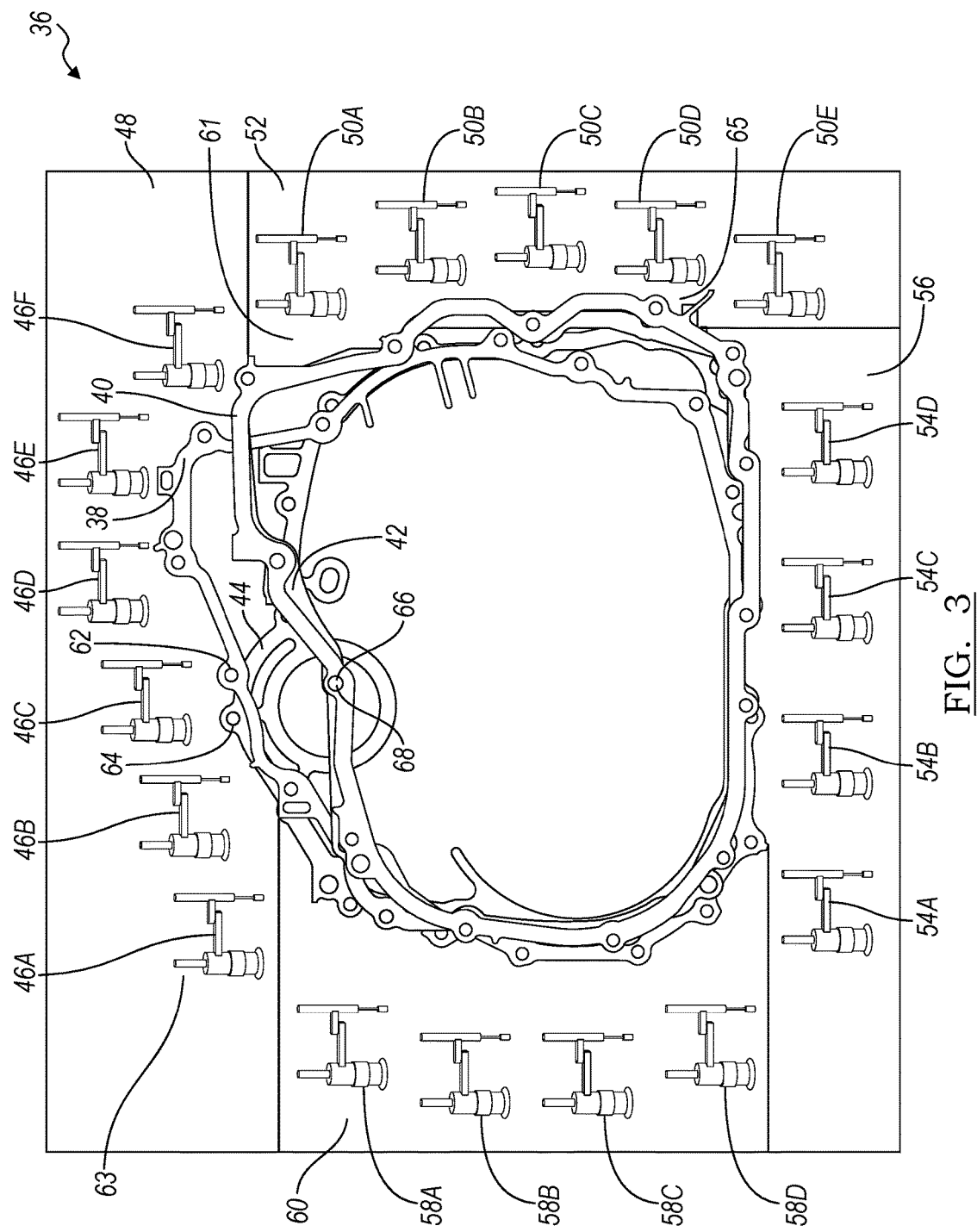
FIG. 3 is a diagrammatic view of a reconfigurable fastener multi-spindle tool system of the present disclosure having multiple spindle assemblies.

With continuing reference to FIG. 3, the support members 48, 52, 56, 60 can provide different quantities of spindle assemblies. In the present example, the first support member 48 provides six spindle assemblies 46 and the fourth support member 60 includes four spindle assemblies 58. Each of the spindle assemblies can be aligned to drive fasteners into any one or all four of the first transmission bolt pattern 38, the second transmission bolt pattern 40, the third transmission bolt pattern 42, and the fourth transmission bolt pattern 44. For example the spindle assembly 46c mounted at a predetermined location on the first support member 48 can be adjusted to drive and torque load a fastener into each of an aperture 62 of the first transmission bolt pattern 38, an aperture 64 of the second transmission bolt pattern 40, an aperture 66 of the third transmission bolt pattern 42, and an aperture 68 of the fourth transmission bolt pattern 44. The tool system 36 further provides at least one and according to several aspects multiple template plates 61, 63, 65 that are individually adapted to allow fastener installation into each one of the different transmission bolt patterns based on their unique bolt patterns.

Referring to FIG. 4 and again to FIGS. 1 through 3, the spindle assembly 46a provides common features to each other spindle assembly of the present disclosure, therefore the following discussion of spindle assembly 46a applies equally to the other spindle assemblies discussed herein. Spindle assembly 46a includes a base member 70 which connects to and supports the spindle assembly 46a on the first support member 48. A support ring 72 is connected to the base member 70 and movably receives a support arm sleeve 74. The support arm sleeve 74 is biased in a first direction "A" by a biasing member 75 (shown in phantom) positioned between the support arm sleeve 74 and the support ring 72. The support arm sleeve 74 can be manually or automatically displaced in a downward direction "B" opposite to the direction "A" positioning a key 76 extending from the support arm sleeve 74 to be received in a key-slot 78 created in the support ring 72, thereby temporarily fixing the support arm sleeve 74. According to further aspects, a plurality of key-slots 78 can be provided in the support ring 72 to provide greater opportunity in aligning and fixing the support arm sleeve 74.

A shaft 80 is positioned co-axially on a central longitudinal axis 82 of the base member 70 and the support ring 72 and defines a connecting member for a first support arm 84. The first support arm 84 extends substantially perpendicular to the central longitudinal axis 82. The first support arm 84 can rotate about the central longitudinal axis 82 with the base member 70 fixed to the first support member 48. A second support arm 86 extends substantially parallel to the first support arm 84 and perpendicular to the central longitudinal axis 82. The second support arm 86 is movably connected to the first support arm 84 by a pin 88 extending through an aperture 90 of the first support arm 84. The pin 88 defines an axis of rotation 92 for the second support arm 86 independent of the rotation of the second support arm 86 about the central longitudinal axis 82. Other connecting members can also be used in lieu of the pin 88, such as a rivet, a fastener, or the like. A spindle 94 having a DC electric motor providing axial rotational driving force is fixed to the second support arm 86 and therefore together with the second support arm 86 is also rotatable and displaceable both with respect to the axis of rotation 92 and the central longitudinal axis 82.

A spindle shaft 96 is retractable in a direction "C" and extends during installation of a fastener in a direction "D" with respect to a free end 98 of the spindle 94. A fastener engagement tool or adapter 100 is positioned at an end of the spindle shaft 96 to grip a fastener such as the fastener 16 described in reference to FIG. 1. The spindle 94 and the spindle shaft 96 are both coaxially aligned with respect to a spindle longitudinal axis 102, which is oriented parallel to the central longitudinal axis 82. During operation of the spindle 94, an axial torque generated by the spindle 94 on the spindle shaft 96 is reacted by a reaction plate 104 fixed proximate to the free end 98 of the spindle 94 and described in greater detail in reference to FIG. 5. According to several aspects, the reaction plate 104 is rectangular shaped, but can be any geometric shape which prevents axial rotation of the spindle 94.

The spindle assembly 46*a* is operated by rotating one or both of the first support arm 84 and the second support arm 86 until the spindle longitudinal axis 102 is coaxially aligned with one of the apertures such as the aperture 64 of the fourth transmission bolt pattern 44. A distance "E" between the central longitudinal axis 82 and the spindle longitudinal axis 102 is therefore variable to suit the location of the aperture in the transmission components. When the spindle longitudinal axis 102 has been coaxially aligned with one of the apertures the support arm sleeve 74 is temporarily locked to the support ring 72 using the key 76 to fix the position of the spindle longitudinal axis 102. The remaining ones of the spindle assemblies, for example the spindle assemblies described in reference to FIG. 3, are similarly aligned with desired aperture locations. All of the spindle assemblies can then be energized and operated simultaneously. The first support arm 84 can be rotated substantially 360 degrees with respect to the central longitudinal axis 82. The second support arm 86 can be rotated approximately 340 to 350 degrees with respect to the spindle longitudinal axis 102, limited by contact between the spindle 94 and the first support arm 84.

Referring to FIG. 5 and again to FIGS. 1 through 4, in order to accommodate driving fasteners into multiple different bolt patterns, the tool system 36 provides a different spindle reaction plate for each of the first transmission bolt pattern 38, the second transmission bolt pattern 40, the third transmission bolt pattern 42, and the fourth transmission bolt pattern 44. For example, as shown in FIG. 5, a first template plate 106 is adapted to support installation of fasteners into the apertures of the fourth transmission bolt pattern 44 of a housing portion 108. The first template plate 106 provides a substantially planar body 110, having an outer perimeter 112 shaped to mimic the locations of the multiple apertures of the fourth transmission bolt pattern 44 and the housing portion 108. Multiple rectangular shaped openings including a first opening 114 and a second opening 116 are individually centrally aligned with the central axis of individual ones of the apertures of the fourth transmission bolt pattern 44 and the housing portion 108. For example, the first opening 114 is centrally aligned with a central axis of the aperture 64 of the fourth transmission bolt pattern 44. A template center column support member 118 is provided with the first template plate 106, which mounts the first template plate 106 to a fixture defined by the assembly of components herein above the fourth transmission bolt pattern 44 and the housing portion 108.

Figure 4:
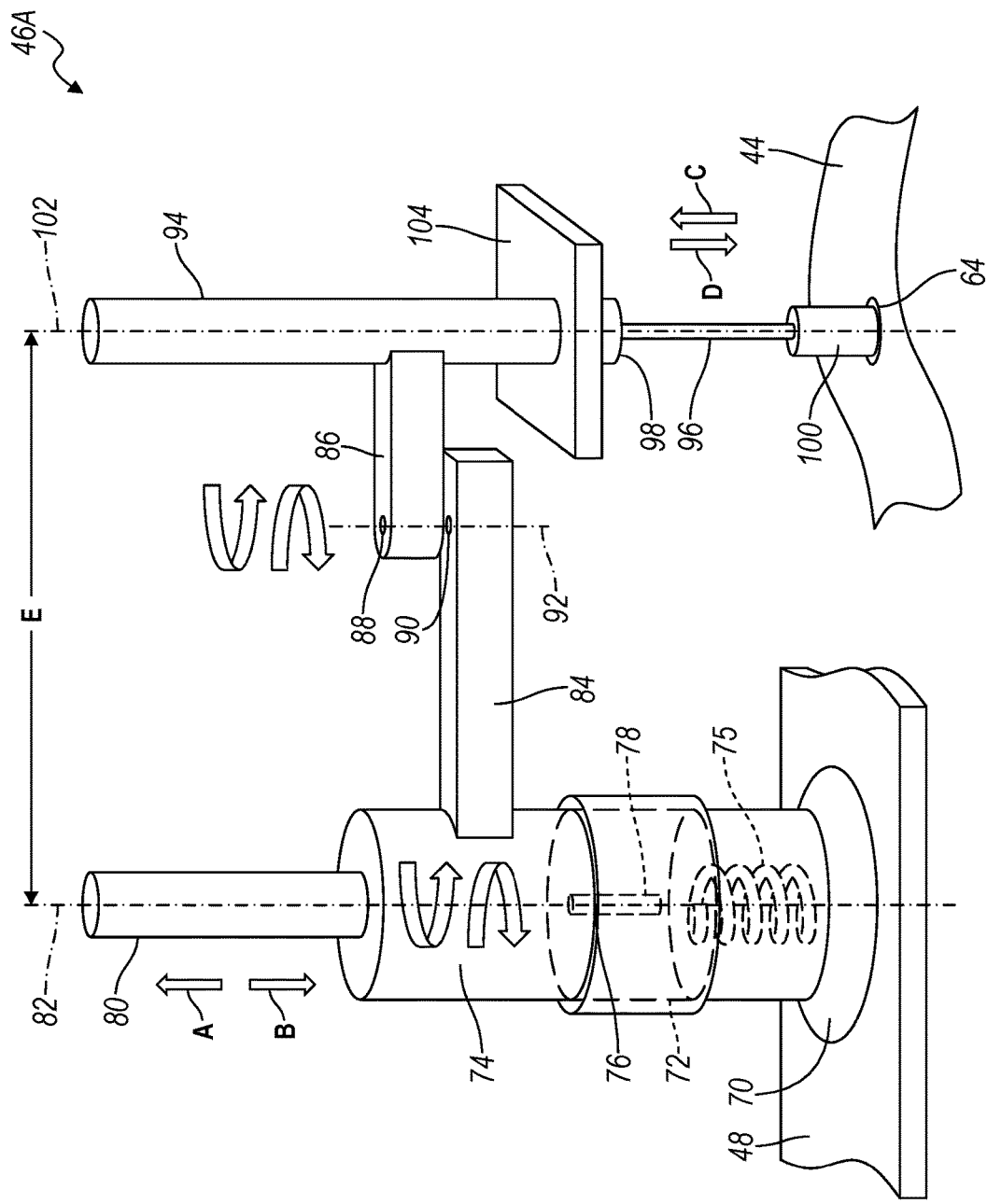
FIG. 4 is a front perspective view of one of the spindle assemblies of FIG. 3.
Figure 5:
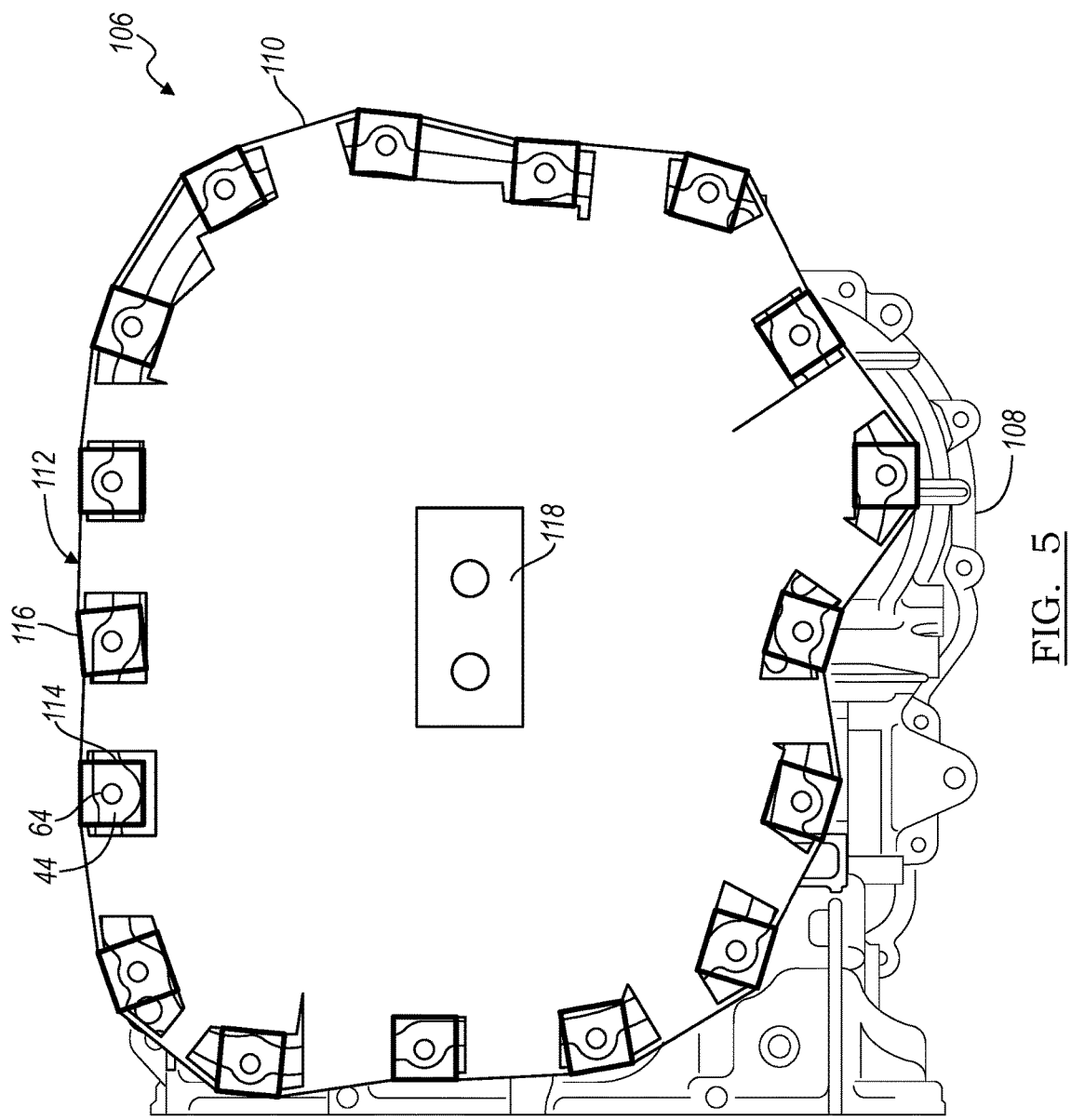
FIG. 5 is a top plan view of a template plate adapted for use with the reconfigurable fastener multi-spindle tool system of the present disclosure.

With continuing reference to FIG. 5 and again to FIG. 4, each of the openings created in the first template plate 106 is rectangular shaped, and is sized to receive one of the spindle assembly reaction plates such as the reaction plate 104 of the spindle assembly 46*a*. As the support arm sleeve 74 is temporarily locked to the support ring 72 using the key 76 to fix the position of the spindle longitudinal axis 102, the reaction plate 104 is received in the first opening 114. The remaining reaction plates of the other spindle assemblies are similarly positioned within corresponding ones of the other openings such as the second opening 116 of the first template plate 106.

According to several aspects, multiple template plates in addition to the first template plate 106 are individually created, each one matching the geometry of one of the other transmission bolt patterns and its associated housing portion, such as the first transmission bolt pattern 38, the second transmission bolt pattern 40, or the third transmission bolt pattern 42. The geometry of each opening of each template plate matches the geometry of each of the reaction plates of the spindle assemblies, such that the reaction plates 104 when received in an opening of a template plate prevent axial rotation of the associated spindle as torque is applied to a fastener.

According to several aspects of the present disclosure, a reconfigurable fastener multi-spindle tool system 36 includes multiple spindle assemblies 46, 50, 54, 58, each including a support ring 72 and a support arm sleeve 74 received in the support ring 72 and rotatable on a central longitudinal axis 82 of the support ring 72. At least one support arm 84 is connected to the support arm sleeve 74. The at least one support arm 84, 86 rotates with respect to the central longitudinal axis 82. A spindle 94 is fixed to the support arm (84 or 86) and is displaceable with respect to the central longitudinal axis 82. The spindle 94 has an adaptor 100 to temporarily retain and torque a fastener 16. A reaction plate 104 is connected to the spindle 94 and has a geometric shape. At least one template plate 106, 61, 63, 65 has multiple openings 114, 116 each having a geometric shape matching the geometric shape of the reaction plate 104. One of the openings 114 receives the reaction plate 104 thereby preventing axial rotation of the spindle 94.

With continuing reference to FIG. 4, a single support arm such as the first support arm 84 can also be provided in lieu of both the first support arm 84 and the second support arm

86. The use of two support arms however maximizes the ability of each spindle assembly to be used in the greatest number of installations and different bolt patterns. According to several aspects, the spindle assemblies 46, 50, 54, 58, the at least one template plate 106, 61, 63, 65 and the support members 48, 52, 56, 60 together define a fixture.

A reconfigurable fastener multi-spindle tool system 36 of the present disclosure offers several advantages. These include the use of first and second support arms 84, 86 which allow the spindle to move in any horizontal direction to maximize the number of different bolt patterns the same spindle assembly can be used for to install fasteners. By spring loading the support arm sleeve 74 and providing the key 76 and the key-slot 78, the spindle assembly can be moved to different fastener installment positions and temporarily locked in place at each position. The pin 88 connection between the first and second support arms 84, 86 allows the support arms 84, 86 to rotate independently of each other, further increasing the range of locations for the spindle 94.

The description of the invention is merely exemplary in nature and variations that do not depart from the gist of the invention are intended to be within the scope of the invention. Such variations are not to be regarded as a departure from the spirit and scope of the invention.

What is claimed is:

1. A reconfigurable fastener multi-spindle tool system, comprising:
    multiple spindle assemblies, each including:
        a support ring;
        a support arm sleeve received in the support ring and rotatable with respect to the support ring on a central longitudinal axis;
        at least one support arm connected to the support ring, the at least one support arm rotating with respect to the central longitudinal axis;
        a spindle connected to the at least one support arm and movable with respect to the central longitudinal axis, the spindle having an adaptor operating to hold and torque a fastener;
        a reaction plate connected to the spindle and having a geometric shape;
        at least one template plate having multiple openings each having a geometric shape matching the geometric shape of the reaction plate, one of the openings receiving the reaction plate of one of the multiple spindle assemblies thereby preventing spindle axial rotation; and
        wherein the at least one support arm includes a first support arm directly connected to the support ring and a second support arm connected to the first support arm, the spindle directly connected to the second support arm and displaced with respect to the central longitudinal axis by rotation of the second support arm independent of the first support arm.

2. The reconfigurable fastener multi-spindle tool system of claim 1, wherein the first support arm and the second support arm extend generally perpendicular to the central longitudinal axis.

3. The reconfigurable fastener multi-spindle tool system of claim 1, further including a pin extending through an aperture of the first support arm to connect the second support arm to the first support arm.

4. The reconfigurable fastener multi-spindle tool system of claim 3, wherein the pin defines an axis of rotation of the second support arm independent from the central longitudinal axis.

5. The reconfigurable fastener multi-spindle tool system of claim 1, further including:
    a base member connected to the support ring and connected to and supporting the spindle assembly on a support member; and
    a shaft connected to the support ring and extending co-axially on the central longitudinal axis of the base member.

6. The reconfigurable fastener multi-spindle tool system of claim 1, wherein the support arm sleeve is biased in a first direction "A", the support arm sleeve when moved in a direction "B" opposite to the direction "A" permits a key extending from the support arm sleeve to be received in a key-slot created in the support ring, thereby temporarily fixing the support arm sleeve to the support base member.

7. The reconfigurable fastener multi-spindle tool system of claim 1, wherein the at least one template plate includes a substantially planar body.

8. The reconfigurable fastener multi-spindle tool system of claim 1, wherein the spindle is movable to different aperture locations of multiple different housing fastener positions.

9. The reconfigurable fastener multi-spindle tool system of claim 8, wherein the at least one template plate includes multiple template plates each having an outer perimeter shaped to mimic one of the different aperture locations of the multiple housing fastener positions.

10. The reconfigurable fastener multi-spindle tool system of claim 1, wherein each of the multiple openings of the at least one template plate is centrally aligned with an aperture created in a housing fastener position.

11. The reconfigurable fastener multi-spindle tool system of claim 1, wherein the support arm sleeve is manually rotatable and manually axially displaceable with respect to the support ring.

12. The reconfigurable fastener multi-spindle tool system of claim 1, wherein the support arm sleeve is normally biased away from a temporary locked position.

13. A reconfigurable fastener multi-spindle tool system, comprising:
    multiple spindle assemblies, each including:
        a support ring;
        a support arm sleeve received in the support ring and rotatable on a central longitudinal axis of the support ring;
        at least one support arm connected to the support ring, the at least one support arm rotating with respect to the central longitudinal axis;
        a spindle fixed to the at least one support arm and displaceable with respect to the central longitudinal axis, the spindle having an adaptor operating to temporarily retain and torque a fastener;
        a reaction plate connected to the spindle and having a geometric shape;
        at least one template plate having multiple openings each having a geometric shape matching the geometric shape of the reaction plate, one of the openings receiving the reaction plate thereby preventing axial rotation of the spindle; and
        a key extending from the support arm sleeve received in a key-slot created in the support ring, thereby temporarily fixing the support arm sleeve to the support base member.

14. The reconfigurable fastener multi-spindle tool system of claim 13, wherein the reaction plates of the other ones of the spindle assemblies are individually positioned in the remaining ones of the multiple openings permitting operation of all of the spindle assemblies at the same time.

15. The reconfigurable fastener multi-spindle tool system of claim 14, wherein each spindle assembly further includes a base member connected to the support ring and connected to a support member, wherein the spindle assemblies, the at least one template plate and the support member define a fixture.

16. The reconfigurable fastener multi-spindle tool system of claim 13, wherein the at least one support arm includes a first support arm and a second support arm connected to the first support arm.

17. A method to operate a reconfigurable fastener multi-spindle tool system, comprising:
constructing a spindle assembly, including:
disposing a support arm sleeve in a support ring such that the support arm sleeve is rotatable on a central longitudinal axis of the support ring;
positioning a key extending from the support arm sleeve in a key-slot created in the support ring, thereby temporarily fixing the support arm sleeve to the support base member;
connecting first and second support arms to the support ring;
supporting the support arms with respect to the central longitudinal axis;
fixing a spindle to the second support arm such that the spindle is displaceable with respect to the central longitudinal axis and rotatable with respect to an axis of rotation of the second spindle;
providing the spindle with an adaptor operating to temporarily retain and torque a fastener; and
connecting a reaction plate having a geometric shape to the spindle;
installing a template plate adjacent to the spindle assembly, the template plate having multiple openings each having a geometric shape matching the geometric shape of the reaction plate;
positioning the spindle proximate to one of the multiple openings; and
inserting the reaction plate into one of the openings to prevent axial rotation of the spindle when the fastener is installed by operation of the spindle.

* * * * *